(12) United States Patent
Nakamura

(10) Patent No.: US 7,190,968 B2
(45) Date of Patent: Mar. 13, 2007

(54) PORTABLE DEVICE DISPLAYING AN IMAGE PROVIDED BY PHOTOGRAPHING

(75) Inventor: Tamaki Nakamura, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 649 days.

(21) Appl. No.: 10/625,622

(22) Filed: Jul. 24, 2003

(65) Prior Publication Data

US 2004/0023685 A1    Feb. 5, 2004

(30) Foreign Application Priority Data

Jul. 30, 2002  (JP)  .............................. 2002-221909

(51) Int. Cl.
*H04M 1/00* (2006.01)

(52) U.S. Cl. ..................... 455/550.1; 455/93; 455/95; 455/66.1; 455/403; 455/566; 455/575.3; 725/62; 345/169; 345/547; 348/14.07; 348/333.06; 348/376

(58) Field of Classification Search ............ 455/550.1, 455/566, 575.3, 93, 66.1, 403; 725/141, 725/153, 169, 47, 62; 345/547, 169; 348/14.07, 348/333.06, 376
See application file for complete search history.

(56) References Cited

U.S. PATENT DOCUMENTS

| | | | | |
|---|---|---|---|---|
| 6,487,069 | B1 * | 11/2002 | Onodera ...................... | 361/683 |
| 6,957,083 | B2 * | 10/2005 | Ikeda et al. ............... | 455/556.1 |
| 6,965,413 | B2 * | 11/2005 | Wada ......................... | 348/376 |
| 7,046,287 | B2 * | 5/2006 | Nishino et al. ........ | 348/333.06 |
| 2001/0005454 | A1 | 6/2001 | Nishino et al. | |
| 2002/0051060 | A1 | 5/2002 | Wada | |
| 2004/0204064 | A1 * | 10/2004 | Ikeda et al. ............... | 455/556.1 |
| 2005/0153679 | A1 * | 7/2005 | Kim .......................... | 455/403 |
| 2005/0287953 | A1 * | 12/2005 | Ikeda et al. ............... | 455/66.1 |
| 2006/0063570 | A1 * | 3/2006 | Nishimura ............... | 455/575.3 |

FOREIGN PATENT DOCUMENTS

| | | |
|---|---|---|
| CN | 1302152 A | 7/2001 |
| EP | 0 807 879 A2 | 11/1997 |
| EP | 1 111 919 A2 | 6/2001 |
| EP | 1 217 422 A1 | 6/2002 |
| JP | 2002-325127 | 8/2002 |
| KR | 2001-0070348 | 7/2001 |
| WO | WO 01/53918 A1 | 7/2001 |

\* cited by examiner

*Primary Examiner*—Matthew Anderson
*Assistant Examiner*—Shaima Q. Aminzay
(74) *Attorney, Agent, or Firm*—Birch, Stewart, Kolasch & Birch, LLP

(57) ABSTRACT

In a foldable cellular phone, an image taken and provided by a camera portion is displayed on a first or second display portion for previewing before storage in a third memory. The second display portion displays the image in the opposite directions corresponding to a folded state and an open state, respectively. In either the folded state or the open state, a second display driver portion rotates the image by 180 degrees to display the image on the second display portion for previewing. Although the direction of the image displayed on the second display portion is inverted depending on the state selected between the folded state and the open state, the second display portion displays the image in a constant direction with respect to a user in both the folded state and the open state of the cellular phone during the previewing operation.

13 Claims, 15 Drawing Sheets

FIG.8

| PATTERN | ORIGIN POINT POSITION ST | | | PHOTOGRAPHING | PREVIEWING | | |
|---|---|---|---|---|---|---|---|
| | 71: CCD | 72: 2ND DISPLAY PORTION | 73: 1ST DISPLAY PORTION | 74: OPEN/CLOSE STATE | 75: 1ST DISPLAY PORTION (OPEN) | 76: 2ND DISPLAY PORTION (OPEN) | 77: 2ND DISPLAY PORTION (CLOSE) |
| P1 | OPEN-UPPER LEFT | CLOSE-UPPER LEFT | OPEN-UPPER LEFT | OPEN | 0 | 180 | 0 |
| P2 | OPEN-UPPER LEFT | OPEN-UPPER LEFT | OPEN-UPPER LEFT | CLOSE | 180 | 0 | 180 |
| P3 | CLOSE-UPPER LEFT | CLOSE-UPPER LEFT | OPEN-UPPER LEFT | OPEN | 0 | 0 | 180 |
| P4 | CLOSE-UPPER LEFT | OPEN-UPPER LEFT | OPEN-UPPER LEFT | CLOSE | 180 | 180 | 0 |
| P5 | OPEN-UPPER LEFT | CLOSE-UPPER LEFT | OPEN-LOWER RIGHT | OPEN | 0 | 180 | 0 |
| P6 | OPEN-UPPER LEFT | OPEN-UPPER LEFT | OPEN-LOWER RIGHT | CLOSE | 180 | 0 | 180 |
| P7 | CLOSE-UPPER LEFT | CLOSE-UPPER LEFT | OPEN-LOWER RIGHT | OPEN | 0 | 180 | 0 |
| P8 | CLOSE-UPPER LEFT | OPEN-UPPER LEFT | OPEN-LOWER RIGHT | CLOSE | 180 | 0 | 180 |

PORTABLE DEVICE DISPLAYING AN IMAGE PROVIDED BY PHOTOGRAPHING

The present application claims priority under 35 U.S.C. §119 to Japanese Patent Application No. 2002-221909, filed Jul. 30, 2002, the entire disclosure of which is hereby incorporated by reference.

BACKGROUND OF THE INVENTION

1. Field of the Invention

The present invention relates to a portable device, and particularly to a portable device having a photographing function and a function of displaying an image obtained by photographing.

2. Description of the Background Art

In recent years, cellular phones have been widely used. Shapes of such cellular phones can be roughly divided into three types, i.e., a straight type, a flip type and a clamshell type. Among them, the cellular phone of the clamshell type can be small in size when it is folded so that the needs for it are higher than those for the other types.

Recently, a cellular phone shown in FIGS. 15A and 15B has been proposed. The cellular phone in FIGS. 15A and 15B has two bodies coupled together by a coupling portion allowing opening and closing thereof. One of the bodies is provided with a main liquid crystal display 104 (which will be referred to as a "main display 104" hereinafter), a liquid crystal sub-display 120, which is arranged on a rear surface of the body remote from liquid crystal display 104 (and will be referred to as a "sub-display 120" hereinafter), a camera portion 121, which receives reflected light from a subject by a CCD (Charge Coupled Device) and provides an electric signal forming an image signal, and an antenna 106 as well as first and second shutter keys 113 and 107 allowing external operations. Main display 104 or sub-display 120 displays an image of the subject according to the image signal provided from camera portion 121.

FIG. 15A shows a case, in which a user opens the cellular phone and takes a picture of the subject by camera portion 121. In this case, the user views main display 104 to check images of the subject obtained by camera portion 121, and presses first shutter button 113 to operate a shutter when an intended picture is viewed. Image data of the subject obtained by this shutter operation is stored in an internal image memory (not shown) of the cellular phone. FIG. 15B shows a case, in which the user keeps the cellular phone in a closed position, and directs camera portion 121 to the user himself for taking a picture of the user himself. In this case, the user views sub-display 120 to check the pictures of the user himself obtained by camera portion 121, and operates the shutter by pressing second shutter button 107 when an intended picture is viewed.

According to the cellular phone with the camera described above, the direction of the camera portion in the folded state is opposite to that in the open state unless the user changes the position or direction of the cellular phone in user's hand when the state changes between the folded state and the open state. Thus, the positions of the CCD of the camera portion, where the reflected light coming from the subject is received, are inverted depending on the state of the cellular phone. Therefore, images are displayed according to the image signals provided from the camera portion in such a manner that the image taken in the folded state is inverted with respect to that taken in the open state. More specifically, when images of a human were taken in the folded state and the open state, respectively, a head is in an upper (normal) position according to the image obtained in one of these states, and the head is in a lower (upside-down) position according to the image obtained in the other state. Therefore, the user must change the position of the cellular phone in his hand for checking or previewing the displayed image so that the user can view the image in the normal position and direction.

SUMMARY OF THE INVENTION

Accordingly, an object of the invention is to provide a cellular phone allowing easy checking or previewing of the displayed images.

For achieving the above object, a portable device according to an aspect of the invention includes a first body, a second body and a coupling portion coupling the first and second bodies together, and the coupling portion couples the first and second bodies in a foldable fashion. The portable device further includes a photographing portion capable of photographing in both a folded state and an open state, a preview image display portion displaying a preview image based on an image taken and provided by the photographing portion for previewing the provided image before storing, a first display portion and a second display portion displaying the image in one of opposite directions corresponding to the folded state and the open state, respectively. The preview image display portion includes a first preview display portion displaying the preview image on the first display portion, and a second preview display portion displaying the preview image rotated by 180 degrees on the second display portion in either the folded state or the open state for previewing.

For previewing or checking the image taken and provided by the photographing portion before the storage, therefore, the first and second preview display portion display the preview image based on the provided image on the first and second display portions, respectively, so that the image can be previewed on either of the first and second display portions.

Further, the second preview image display portion displays the preview image rotated by 180 degrees on the second display portion in either the folded state or the open state during the preview operation. Therefore, the second display portion can selectively display the image in the opposite directions corresponding to the folded state and the open state, respectively, and the image viewed on the second display portion keeps the same direction independently of the folded state and the open state of the portable device during the previewing.

Accordingly, the user can view the image displayed in the constant direction on the second display portion without changing the direction of the portable device depending on the state (the folded state or open state) during the previewing. This improves the operability and convenience.

For achieving the above object, a portable device according to another aspect of the invention includes a first body, a second body, and a coupling portion coupling the first and second bodies together. The coupling portion couples the first and second bodies in a foldable fashion. The portable device further includes a photographing portion taking and providing an image in one of opposite directions corresponding to the folded state and the open state, respectively, a preview image display portion displaying a preview image based on the image taken and provided by the photographing portion for previewing the provided image before storing, a first display portion, and a second display portion displaying the image in one of opposite directions corresponding to the folded state and the open state, respectively. The preview image display portion includes a first preview display portion displaying a preview image on the first display portion, and a second preview display portion displaying the preview image on the second display portion, and the second preview display portion kept in the open state for the previewing rotates the image provided from the photographing portion kept in either the folded state or the open state in the photographing operation by 180 degrees.

As described above, even when the image provided from the photographing portion was inverted according to the folded state or the open state in the photographing operation, the image provided in one of these states is inverted by 180 degrees so that the images taken and provided in both the folded and open states are kept in the constant direction.

Therefore, even when the direction of the image provided from the photographing portion was inverted according to the folded state or the open state in the photographing operation, the second display portion can display the image in the direction corresponding to the folded state or the open state for the previewing.

Accordingly, the user is not required to change the direction of the portable device according to the folded state or the open state in the previewing operation, and can preview the image on the second display portion in the direction corresponding to the folded state or the open state. This improves the operability and the convenience.

For achieving the above object, a portable device according to still another aspect of the invention includes a first body, a second body, and a coupling portion coupling the first and second bodies together. The coupling portion couples the first and second bodies in a foldable fashion. The portable device further includes a photographing portion taking and providing an image in one of opposite directions corresponding to the folded state and the open state of the portable device, respectively, a preview image display portion displaying a preview image based on the image taken and provided by the photographing portion for previewing the provided image before storing, a first display portion, and a second display portion displaying the image in one of opposite directions corresponding to the folded state and the open state, respectively. The preview image display portion includes a first preview display portion displaying a preview image on the first display portion, and a second preview display portion displaying the preview image on the second display portion, and the second preview display portion kept in the folded state for the previewing rotates the image provided from the photographing portion by 180 degrees held in either the folded state or the open state in the photographing operation.

As described above, even when the image provided from the photographing portion was inverted according to the folded state or the open state in the photographing operation, the image provided in one of these states is inverted by 180 degrees so that the images taken and provided in either of the folded and open states are kept in the constant direction.

Therefore, even when the direction of the image provided from the photographing portion was inverted according to the folded state or the open state in the photographing operation, the second display portion can display the image in the direction corresponding to the folded state or the open state for the previewing.

Accordingly, the user is not required to change the direction of the portable device according to the folded state or the open state in the previewing operation, and can preview the image on the second display portion in the direction corresponding to the folded state or the open state. This improves the operability and the convenience.

Each of the first and second display portions is preferably provided on an externally exposed surface of the first or second body in the open state.

When the portable device is in the open state for the previewing, the same preview image can be displayed in parallel on the first and second display portions provided on the externally exposed surfaces of the first or second body.

Accordingly, a plurality of users can preview the image on the different display portions at the same time, which improves the convenience.

The second display portion is preferably provided on an externally exposed surface of the first or second body in the folded state.

Therefore, even when the portable device is in the folded state during the previewing, the user can preview the image on the second display portion provided on the externally exposed surface of the first or second body.

The portable device further includes a storing portion temporarily storing the image provided from the photographing portion for reading by the preview display portion for providing the preview image, and the storing portion is shared by the first and second preview display portions.

Accordingly, the storing portion temporarily storing the image, which is provided from the photographing portion and will be read out for producing the preview image, is not dedicated to each of the first and second preview display portions (first and second display portions), and is configured to be shared by the first and second preview display portions.

Accordingly, it is possible to reduce a required capacity of the portable device and a required number of parts.

For achieving the above object, a portable device according to yet another aspect of the invention includes a first body, a second body, and a coupling portion coupling the first and second bodies together. The coupling portion couples the first and second bodies in a foldable fashion. The portable device further includes a first display portion provided on a surface hidden in a folded state and exposed externally in an open state, a second display portion provided on a surface exposed externally in the folded state and the open state, a photographing portion capable of taking an image in both the folded state and the open state of the portable device, and a preview image display portion displaying a preview image based on the image taken and provided by the photographing portion for previewing the provided image before storing. The preview image display portion displays the preview image on each of the first and second display portions.

For previewing the image taken and provided by the photographing portion for storing it, therefore, the first and second preview display portions display the preview image based on the image thus provided on the first and second display portions so that the user can preview the image on either of the first and second display portions. More specifically, when the portable device is in the folded state during the previewing operation, the image can be previewed on the second display portion. When it is in the open state, the same image can be simultaneously previewed on each of the first and second display portions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a table illustrating patterns of an operation for image display in a preview mode.

DESCRIPTION OF THE PREFERRED EMBODIMENTS

Embodiments of the invention will now be described with reference to the drawings. By way of example, the embodiment described below relates to a cellular phone. However, the invention can be applied to another device. For example, the invention may be applied to a digital camera, a PDA (Personal Digital Assistant) having a camera function or the like.

Figure 1:
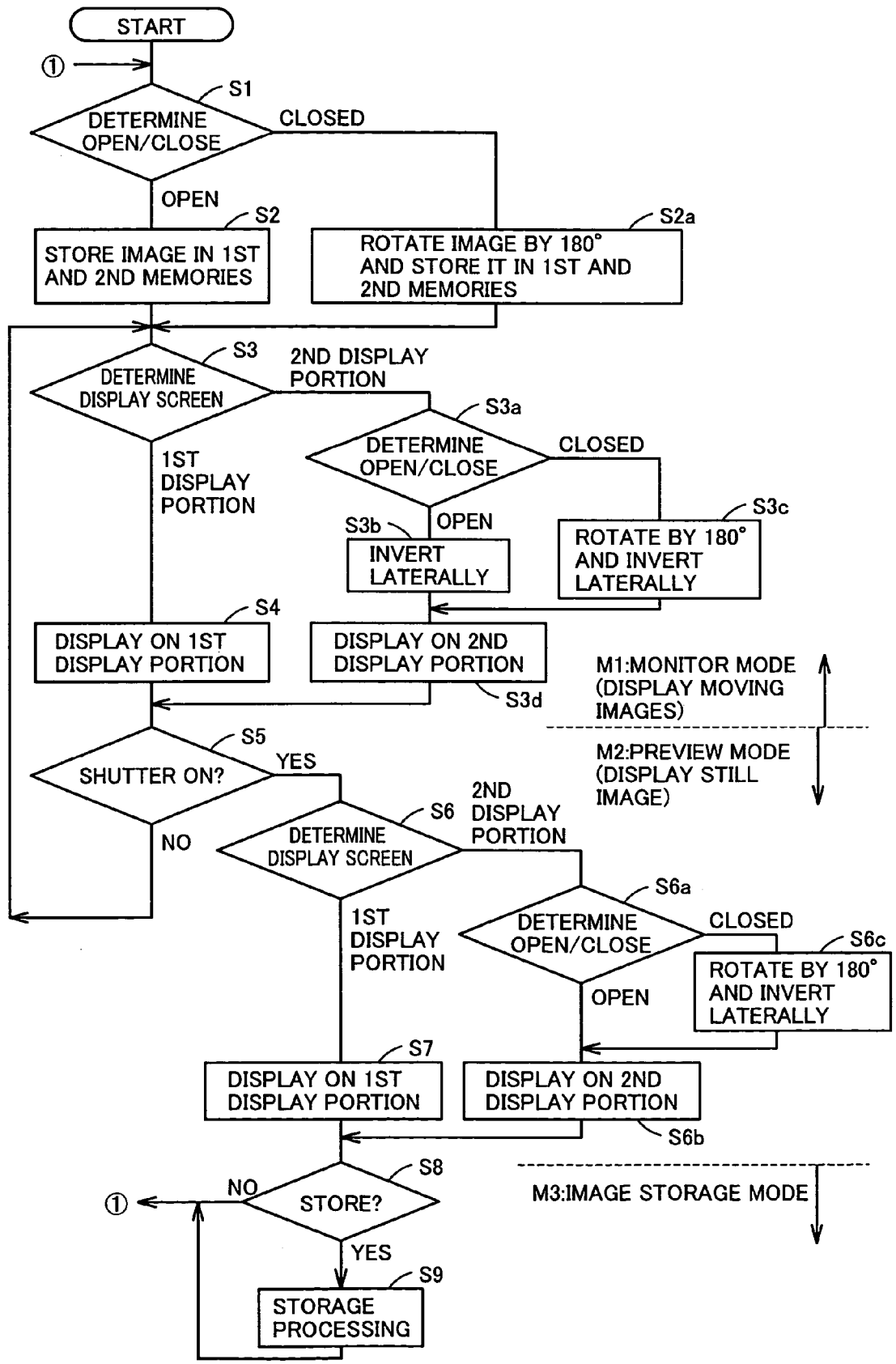
FIG. 1 is a flowchart illustrating steps for image display processing according to an embodiment of the invention.
Figure 2:
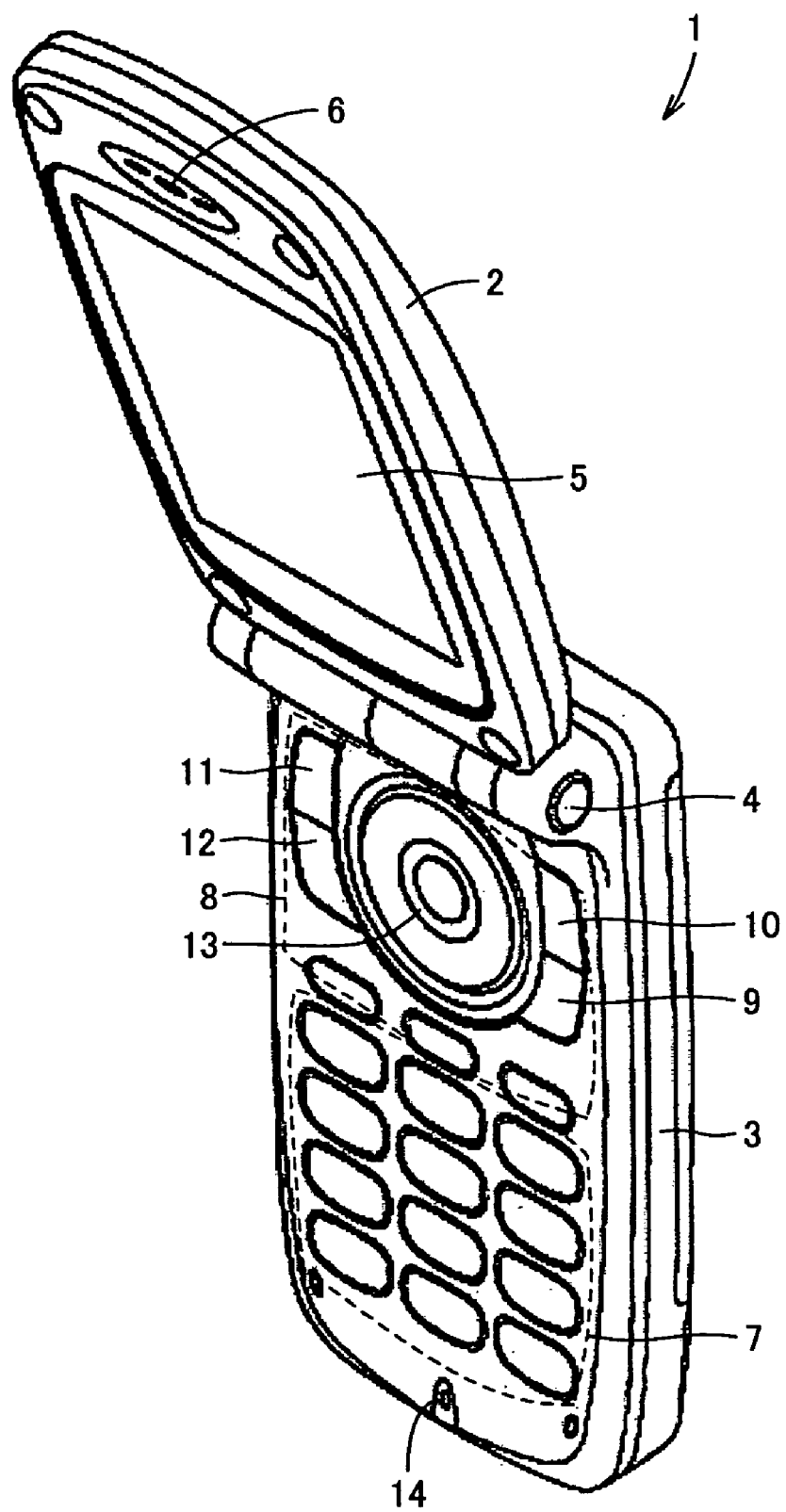
FIG. 2 shows an outer appearance of a cellular phone in an open state according to the embodiment.
Figure 3:
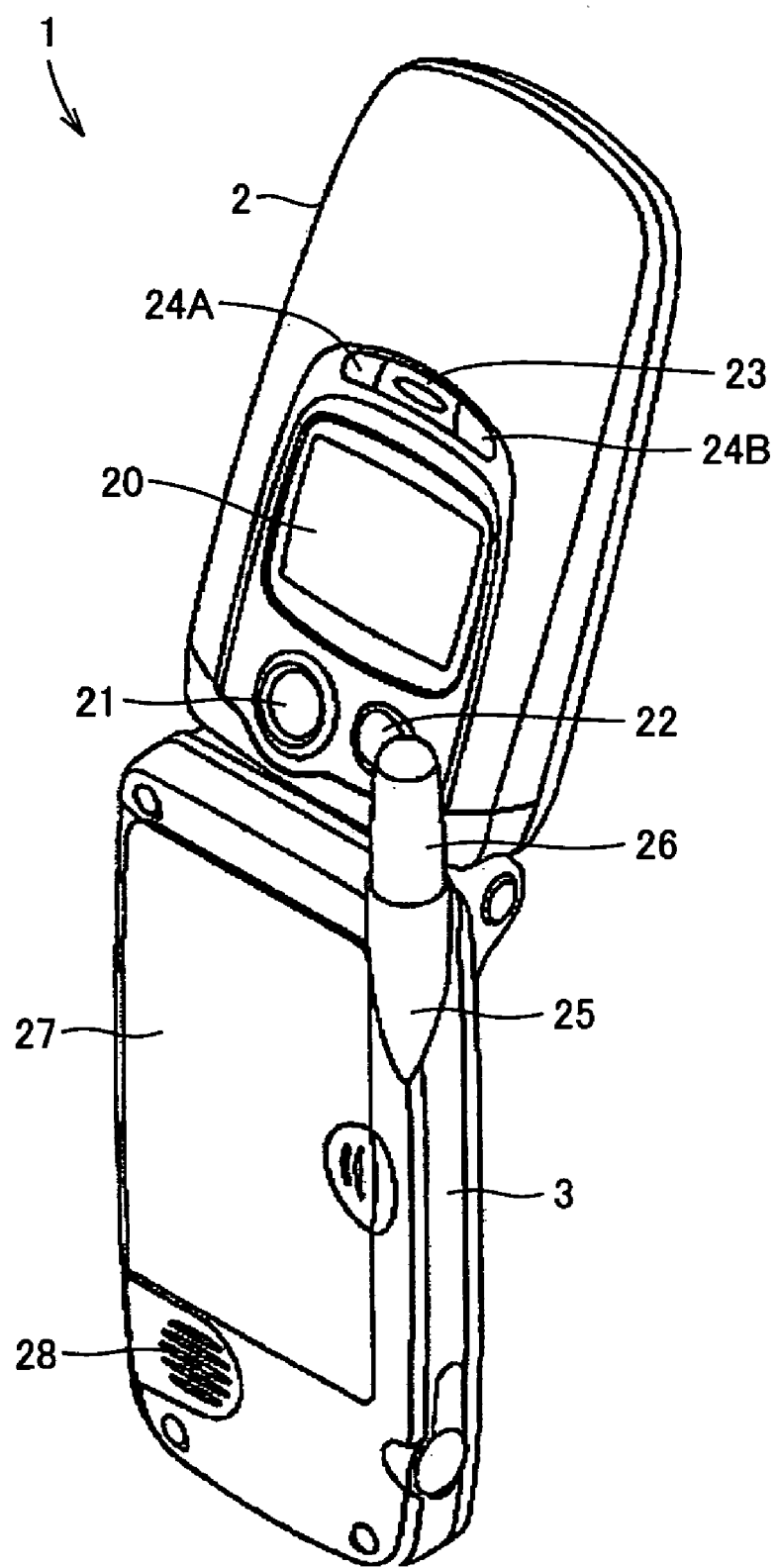
FIG. 3 shows an outer appearance of a rear side of the cellular phone shown in FIG. 2.
Figure 4:
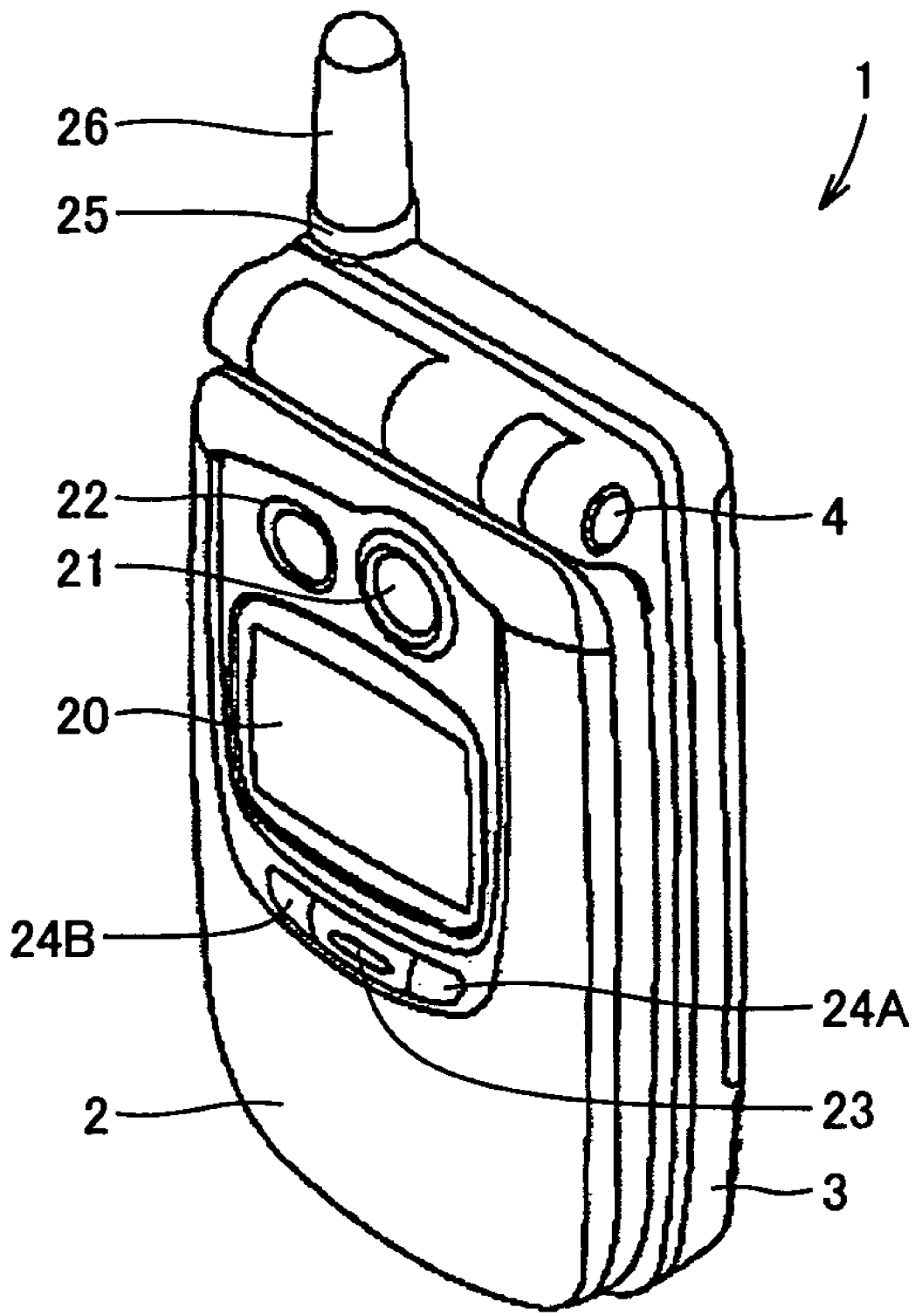
FIG. 4 shows an outer appearance of the cellular phone in the folded state.
Figure 5:
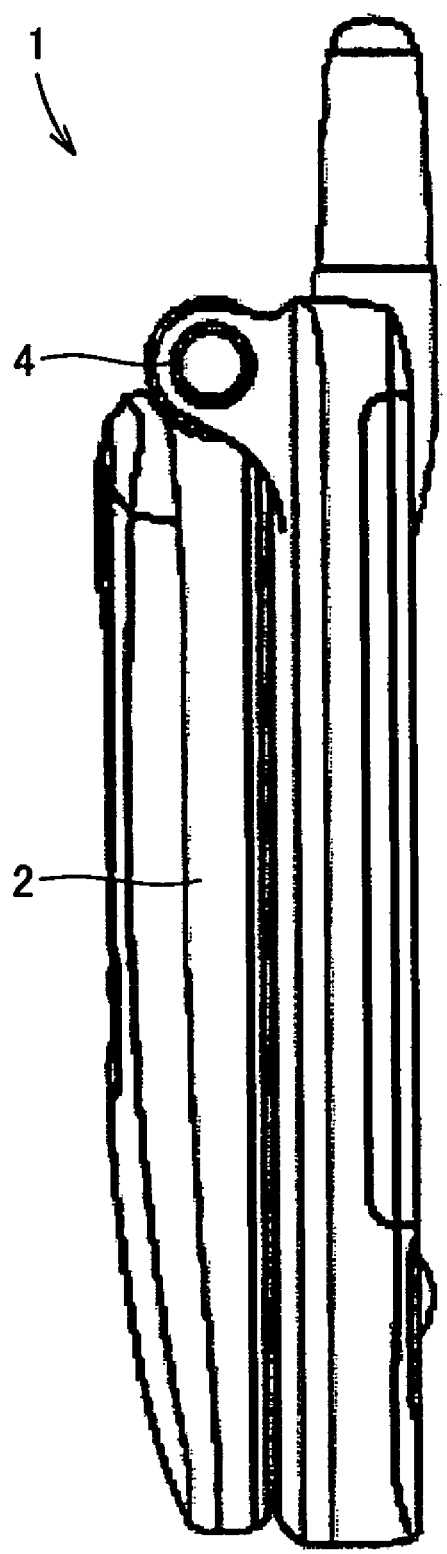
FIG. 5 shows an outer appearance of the cellular phone in the folded state.

FIG. 1 illustrates steps for image display processing according to an embodiment of the invention. FIG. 2 shows an outer appearance of a cellular phone 1 provided with a camera according to the embodiment of the invention, and particularly, cellular phone 1 of a clamshell type, which is in an open state, and will be simply referred to as "cellular phone 1" hereinafter. FIG. 3 shows an outer appearance of a rear side of cellular phone 1 shown in FIG. 2. FIGS. 4 and 5 shows outer appearances of cellular phone 1 in the folded state.

Referring to FIG. 2, cellular phone 1 is formed of first and second bodies 2 and 3. First body 2 is coupled to second body 3 via a hinge 4. The first and second bodies 2 and 3 are angularly movable around hinge 4, and thus provide a foldable structure as shown in FIG. 4.

Cellular phone 1 shown in FIG. 2 is provided at its first body 2 with a first display portion 5. First display portion 5 is located inside cellular phone 1 in the folded state. First display portion 5 is formed of a liquid crystal display, an EL (Electro Luminescent) display or the like, and displays an image based on image data provided via a first display driver portion 43, which will be described later. A speaker 6 is arranged above first display portion 5 for use in telephone conversation and others.

Second body 3 is provided with an input button group 7 formed of keys to be used for entry of numbers, letters and others, a function button group 8 for performing various kinds of setting and function selection in cellular phone 1, a power button 9 for power-on/off, a first shutter button 10 to be used for enabling a shutter function, a mail/guidance button 11 for selecting a camera function, a mail function and guidance display, which will be described later, a start/speaker-conversation button 12 for starting conversation and performing conversation via the speaker, and a multi-guide button 13 formed of a four-way button and a decision button for performing longitudinal and lateral selections on a function select screen as well as deciding the selection. These buttons can be operated by the user. Further, second body 3 is provided at its lower portion with a microphone 14.

Usually, the foregoing portions on second body 3 of cellular phone 1 are arranged in the order of hinge 4, function button group 8, input button group 7 and microphone 14. However, the order is not restricted to the above.

As shown in FIGS. 3 and 4, first body 2 is provided at its rear surface remote from first display portion 5 with a camera portion 21 and a light portion 22, which are close to hinge 4, and is also provided at the rear surface with a second display portion 20 spaced from hinge 4 as well as a second shutter button 23 and second operation buttons 24A and 24B, which are spaced from hinge 4 with second display portion 20 therebetween.

Second display portion 20 is arranged on an outer side of the body of cellular phone 1 in the folded state, and is formed of a liquid crystal display, an EL display or the like. In this embodiment, second display portion 20 has a display region smaller than that of first display portion 5. However, the display region of second display portion 20 may be larger than or equal to that of first display portion 5. Second display portion 20 displays images based on image data, which is obtained by photographing and is provided via a second display driver portion 44 to be described later, as well as data of character images for informing the user of a time, a radio wave intensity, a mail reception and others.

As described above, each of first and second display portions 5 and 20 is provided at the surface of the first or second body, which is exposed externally when the bodies are open, with the display screen directed externally. In particular, second display portion 20 is arranged in the surface, which is exposed externally, of the first or second body in the folded state, and is directed externally when the bodies are in the folded state.

Camera portion 21 includes a picture-taking lens, a picture-taking element such as a CCD image sensor or a CMOS (Complementary Metal Oxide Semiconductor) image sensor and RGB (i.e., red, green and blue) color filters. For the sake of simplicity, it is assumed that camera portion 21 in this embodiment has a CCD image sensor 29, which will be merely referred to as a "CCD 29" hereinafter, as the picture-taking element. In camera portion 21, the light reflected by a subject enters through the picture-taking lens, and is converted by the color filters into RGB light rays, which enter CCD 29. As shown in FIG. 3, when cellular phone 1 is in the folded state, camera portion 21 arranged on the rear surface remote from first display portion 5 is located between hinge 4 and second display portion 20. For taking a picture by camera portion 21 of cellular phone 1 in the open state, the user holds second body 3.

Light portion 22 is used as an auxiliary light source for taking a picture by camera portion 21. In general, xenon lamps have been often used as auxiliary light sources. However, RGB LEDs (Light Emitting Diodes) are currently used in some cases. These LEDs are simultaneously turned on to provide white light illumination.

Second shutter button 23 is arranged at a center of the rear surface remote from first display portion 5 of first body 2, and is located below second display portion 20 of cellular phone 1 in the folded state shown in FIG. 4. Owing to this position of second shutter button 23, the user can easily determine the position of shutter button 23 on folded cellular phone 1, and can easily operate the shutter.

On the opposite sides of second shutter button 23, there are arranged second operation buttons 24A and 24B for setting or operating various kinds of data while viewing information displayed on second display portion 20. Second operation buttons 24A and 24B are operated to select various functions, to display and retrieve an address book, and to check, display and send mails while displaying or manipulating the information on second display portion 20. Second operation buttons 24A and 24B can also be operated, e.g., for zooming in or out a subject, and for displaying a plurality of images by successively forwarding or reversing the images.

Second body 3 is provided at the rear surface remote from input button group 7 and function button group 8 with an antenna portion 25, an extendable helical portion 26, a battery portion 27 for carrying a battery and a second speaker 28 for sounding a ringer toner.

Referring to FIGS. 4 and 5, first body 2 is mechanically coupled to second body 3 via hinge 4, in which a flexible circuit board (not shown) is incorporated for an electrical connection between first and second bodies 2 and 3.

Figure 6A:
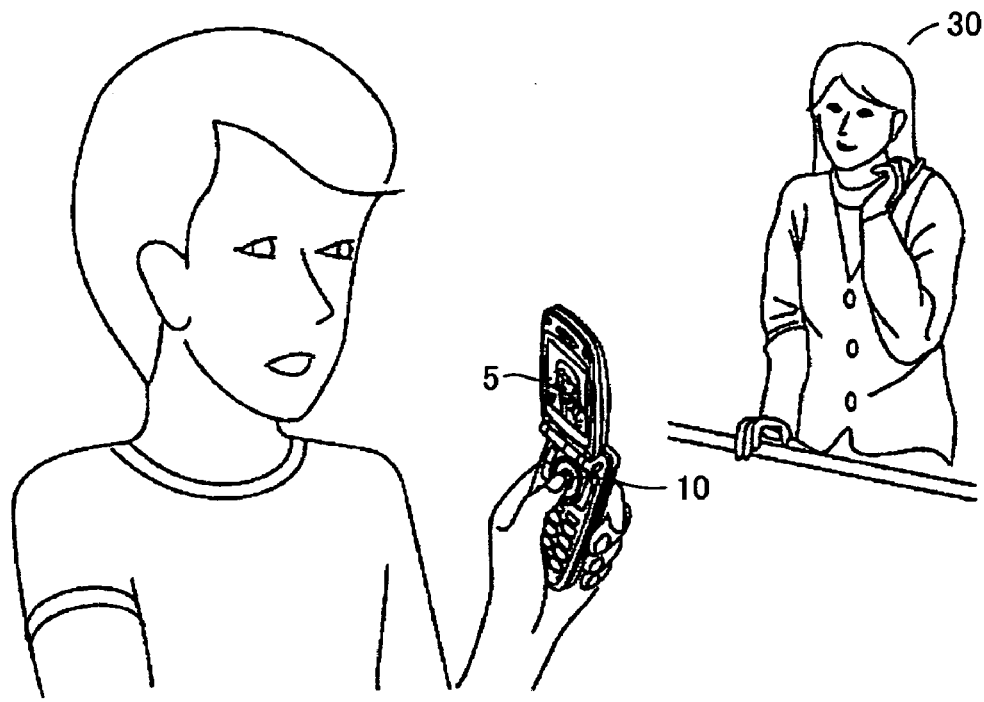
FIGS. 6A and 6B illustrate a manner of using the cellular phone for taking a picture of a subject.
Figure 6B:
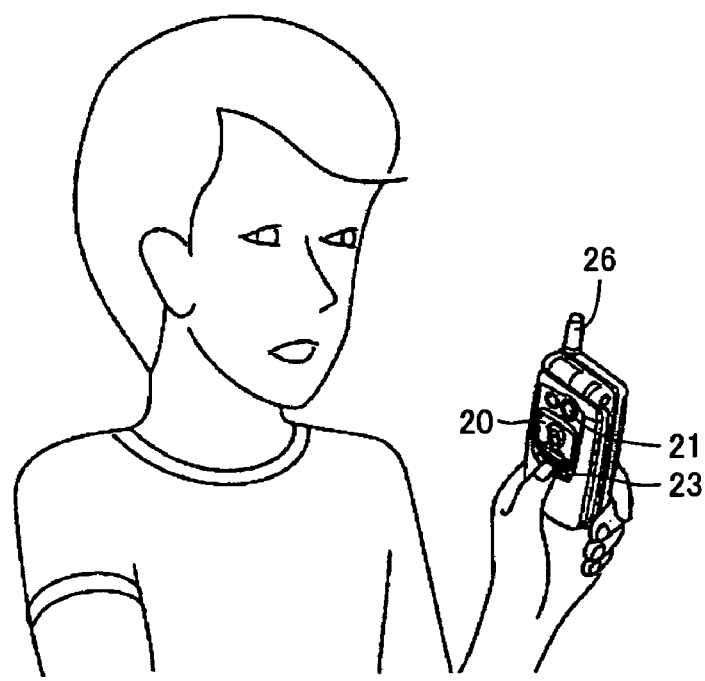

Manners of taking a picture of a subject by camera portion 21 of cellular phone 1 will now be described with reference to FIGS. 6A and 6B. In a general manner of taking a picture of a subject 30 shown in FIG. 6A, the user opens cellular phone 1, and directs camera portion 21 to subject 30 for taking a picture while using first display portion 5 as a finder. Although first shutter button 10 is generally used for operating the shutter, second shutter button 23 arranged on the rear surface of first body 2 can be used. FIG. 6B shows a general manner of taking a picture of the user himself by camera portion 21. In this manner, the user uses second display portion 20 as a finder, and can operate the shutter by pressing second shutter button 23 while viewing an obtained image of the user himself.

In many cases, a general cellular phone displays a mirror image of a subject on second display portion 20 for preventing unnatural feeling. However, the manner is not restricted to this. Since cellular phone 1 can take a picture of the user himself while keeping the folded state, this improves operability and usability. The state of cellular phone 1 for taking a picture of the user himself is not restricted to the folded state, but may be the open state.

Figure 7:
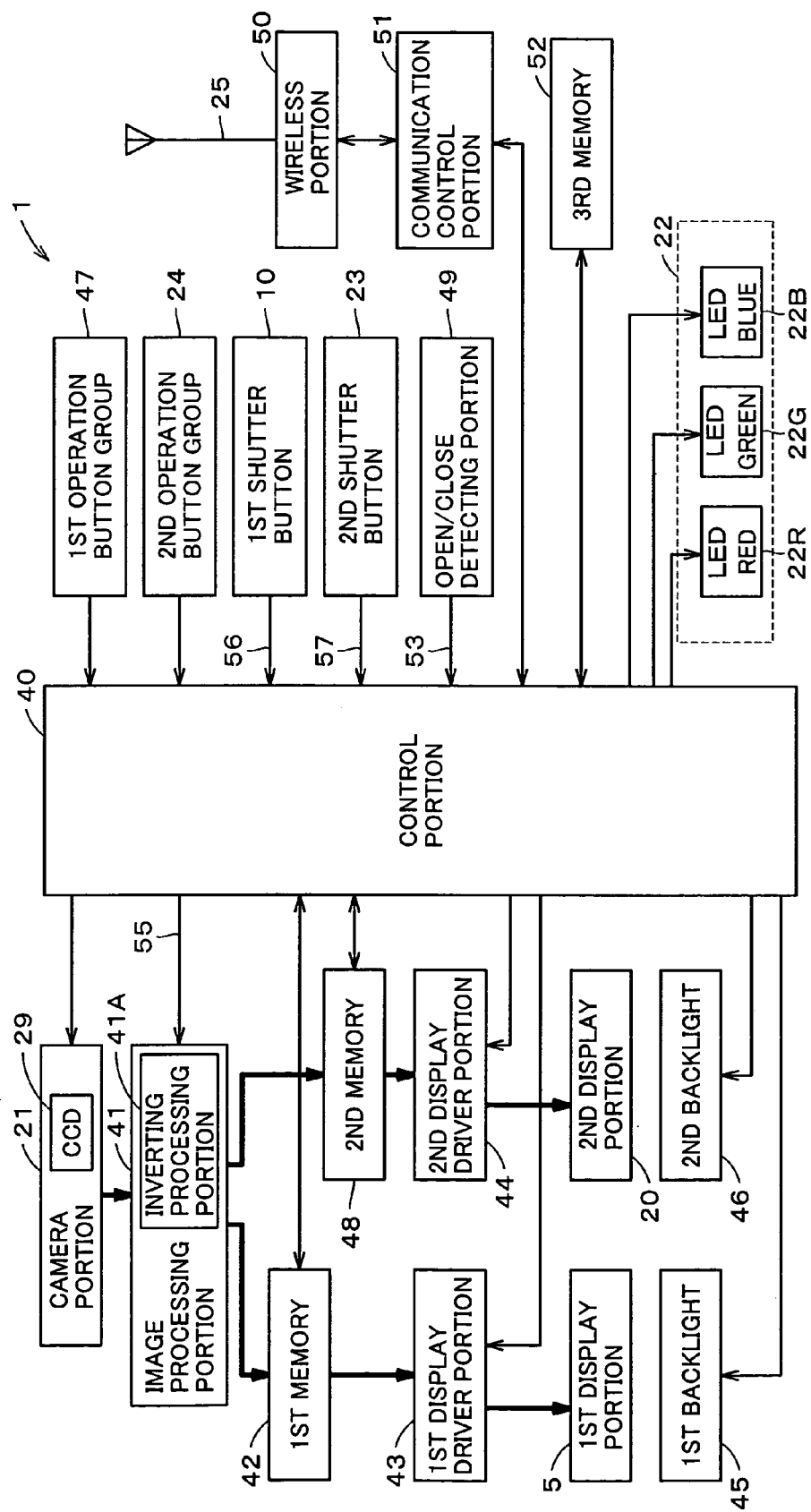
FIG. 7 illustrates an internal structure of the cellular phone.

The internal structure of cellular phone 1 will now be described with reference to FIG. 7. Cellular phone 1 includes first and second display portions 5 and 20, first and second shutter buttons 10 and 23, camera portion 21, light portion 22 formed of red, green and blue LEDs 22R, 22G and 22B, antenna portion 25, a wireless portion 50, a communication control portion 51, first, second and third memories 42, 48 and 52, first and second display drivers 43 and 44, first and second backlights 45 and 46, a control portion 40 controlling functions of various portions, an image processing portion 41, first and second operation button groups 47 and 24, and an open/close detecting portion 49.

Control portion 40 controls functions of various portions such as functions of the shutter operation, backlights, auxiliary light source and displays. Although not shown, image processing portion 41 has an amplifier portion, an A/D (Analog-to-Digital) converting portion and a signal processing portion, and also includes an inversion processing portion 41A. The amplifier portion receives electric signals corresponding to the RGB from camera portion 21, and amplifies them for providing the amplified signals to the A/D converting portion. The A/D converting portion converts the electric analog signals, which correspond to the RGB and are amplified by the amplifier portion, to digital signals, and thereby provides image data to the signal processing portion. The signal processing portion effects signal processing such as pixel interpolating processing on the image data provided from the A/D converting portion, and provides the data thus processed to inverting processing portion 41A. When inverting processing portion 41A receives an inversion control signal 55 from control portion 40, inverting processing portion 41A effects 180-degree inversion on the received image data to rotate a corresponding image by 180 degrees. When inverting processing portion 41A does not receive inversion control signal 55, it outputs the input image data as it its. The image data provided from inverting processing portion 41A is provided to first and second memories 42 and 48.

Camera portion 21 and image processing portion 41 form the photographing portion, which receives light reflected by subject 30, and converts it to electric signals providing image data of each frame. First and second memories 42 and 48 successively receive the image data of a plurality of frames, and temporarily store the image data under the control of control portion 40. For example, when new image data is received for storage, the control is performed to delete image data, which has been stored for a long time, from a plurality of data stored in first and second memories 42 and 48, to overwrite it with the received new image data.

Control portion 40 sends the control signal to first and second display driver portions 43 and 44, and reads the image data stored in first and second memories 42 and 48 to provide it to first and second display driver portions 43 and 44. The first and second driver portions 43 and 44 apply drive voltages to pixel electrodes in first and second display portions 5 and 20 in accordance with the image data to be displayed on first and second display portions 5 and 20, and thus in accordance with the image data read from first and second memories 42 and 48.

First and second backlights 45 and 46 are formed of light-emitting elements such as light-emitting diodes, and emit the light to first and second display portions 5 and 20 for increasing brightness of the displayed images, respectively. Control portion 40 controls the turn-on and turn-off of first and second backlights 45 and 46, and also controls the brightness thereof. First operation button group 47 is formed of input button group 7 and function button group 8 arranged on second body 3 already described. Second operation button group 24 includes operation buttons 24A and 24B arranged on first body 2.

First and second shutter buttons 10 and 23 can be pressed for operating the shutter. When first (or second) shutter button 10 (or 23) is pressed, a shutter instruction 56 (or 57) is sent to control portion 40. Control portion 40 supplied with a shutter instruction 56 (or 57) reads out the image data, which is to be stored according to the user's request, from the plurality of image data, which were continuously written into first and second memories 42 and 48 for temporary storage, and writes it into third memory 52 for storage. Thereby, third memory 52 stores the image data requested by the user. For the sake of simplicity, it is assumed that the latest image data stored in first and second memories 42 and 48 are read and stored.

Open/close detecting portion 49 determines whether cellular phone 1 is folded or not. A detection switch (not shown) for detecting the open and closed states is arranged within hinge 4, and can provides a detection signal 53 corresponding to the detected open or closed state to control portion 40. Control portion 40 determines from a detection signal 53 provided from the detection switch whether cellular phone 1 is folded (closed) or open.

When performing wireless communication with a base station (not shown) via radio waves, antenna portion 25, wireless portion 50 and communication control portion 51 send and receive voice data, text data, image data and others under the control by control portion 40. Control portion 40 stores the data thus received in third memory 52.

As described above, when cellular phone 1 is folded, the photographing direction of camera portion 21 is directed outward. Therefore, for taking a picture of a subject other than the user of cellular phone 1, the user opens cellular phone 1, and directs camera portion 21 toward subject 30 opposite to the user, as shown in FIG. 6A. In this state, first display portion 5 displays an image based on the image data provided from camera portion 21. Thereby, the user can use first display portion 5 as a finder during the photographing operation.

For taking a picture of the user himself, the user folds cellular phone 1, and directs camera portion 21 to the user for taking a picture, as shown in FIG. 6B. In this state, second display portion 20 displays the image based on the image data provided from camera portion 21. Thereby, the user can use second display portion 20 as a finder.

FIG. 8 is a table illustrating all patterns of image display operations in a preview mode. This preview mode is executed prior to the operation of storing the image data, which was obtained by taking a picture of subject 30 by camera portion 21 in response to the operation of first or second shutter button 10 or 23. In this preview mode, an image based on the image data is displayed for previewing or checking it by the user prior to storage in third memory 52. In other words, the preview mode is configured to display the image based on the latest image data, which is stored in the first or second memory 42 or 48 in response to the shutter operation, on the first or second display portion 5 or 20.

Figure 9A:
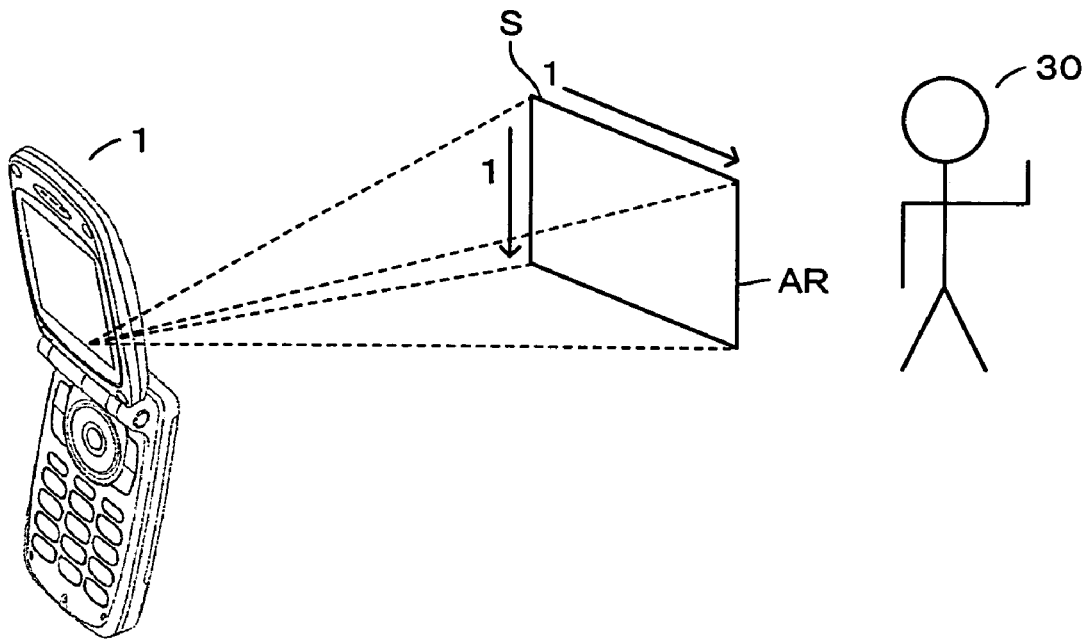
FIGS. 9A and 9B schematically show photographing states of the cellular phone and positions of an origin point on a two-dimensional pixel array of a CCD.
Figure 9B:
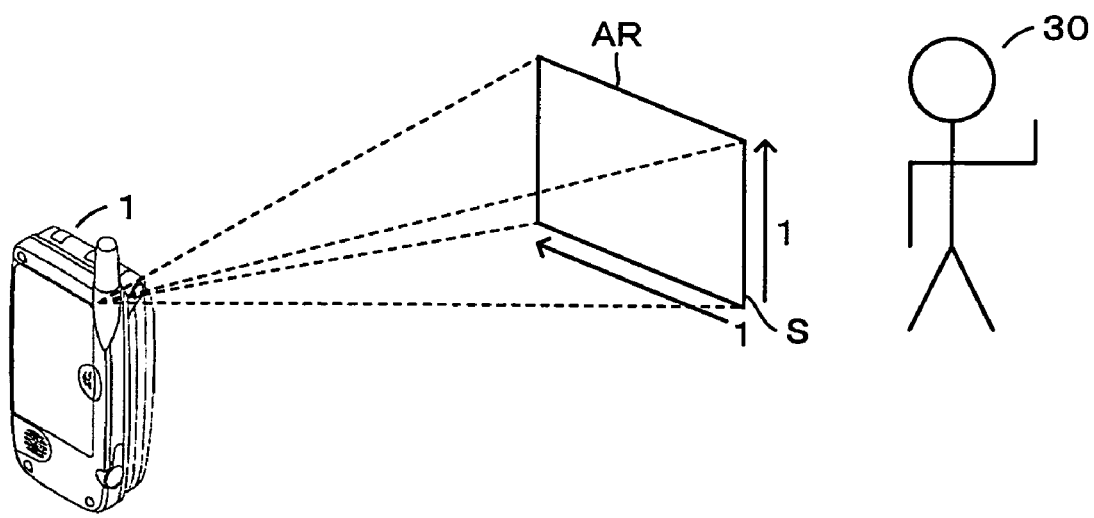

FIGS. 9A and 9B schematically show photographing states of cellular phone 1 as well as positions of origin point S of (1, 1) on a two-dimensional pixel array AR. Origin point S represents a read start point for reading a signal from pixel array AR. In FIG. 9A, cellular phone 1 is open, and hinge 4 is located on the upper side of the second body. In FIG. 9B, cellular phone 1 is closed, and hinge 4 is located on the upper side. In the operations of taking pictures, origin point S on two-dimensional pixel array AR in FIG. 9A is diagonally opposite to that in FIG. 9B. Therefore, when images of the same subject 30 are taken in FIGS. 9A and 9B, the positions, in which pixel array of CCD 29 in the position shown in FIG. 9B receives the light reflected by subject 30 are inverted with respect to normal positions in FIG. 9A.

Accordingly, the image produced from the image signal provided from CCD 29 in FIG. 9B is inverted from that in FIG. 9A.

FIG. 8 illustrates image display patterns P1-P8 in the preview mode. In a manner related to each of patterns P1-P8, FIG. 8 also illustrates positions 71, 72 and 73 of the origin points, which are present in CCD 29, second display portion 20 and first display portion 5, respectively, as well as photographing open/close state 74 representing the open or closed state, which cellular phone 1 attained during photographing of subject 30. Further, FIG. 8 illustrates previewing first display portion (open) 75, previewing second display portion (open) 76 and previewing second display portion (closed) 77 in connection with each pattern. Position 71 of the origin point in CCD 29 indicates the upper left position in either of the open and closed states of cellular phone 1. Position 72 of the origin point in second display portion 20 is likewise represented in connection with each of the open and closed states of cellular phone 1 and each pattern. In all the patterns and in both the open and closed states of cellular phone 1, position 72 of the origin point indicates the upper left position on the screen of second display portion 20 when viewed from the user opposed thereto.

In patterns P1-P4, position 73 of the origin point in first display portion 5 represents an upper left position on the screen of first display portion 5 when viewed from the user opposed thereto while keeping cellular phone 1 open. In patterns P5-P8, position 73 represents a lower right position on the screen of first display portion 5 when viewed from the user opposed thereto while keeping cellular phone 1 open.

Photographing open/close state 74 represents the open or closed state of cellular phone 1 when the user operates camera portion 21 for taking a picture. More specifically, it selectively represents the states in FIGS. 9A and 9B.

Previewing first display portion (open) 75 represents in connection with each pattern whether the image displayed on first display portion 5 is to be inverted or not for displaying it in the normal position (uninverted position) when conditions ST on the left side in the table of FIG. 8 are set, and cellular phone 1 is open and is in the preview mode. If it is to be inverted, "180" is represented. If not, "0" is represented.

Likewise, second display portion (open) 76 represents in connection with each pattern whether the image displayed on second display portion 20 is to be inverted or not for displaying it in the normal position (uninverted position) when conditions ST on the left side in the table of FIG. 8 are set, and cellular phone 1 is open in the preview mode. If it is to be inverted, "180" is represented. If not, "0" is represented.

Likewise, second display portion (closed) 77 represents in connection with each pattern whether the image displayed on second display portion 20 is to be inverted or not for displaying it in the normal position (uninverted position) when conditions ST on the left side in the table of FIG. 8 are set, and cellular phone 1 is closed in the preview mode. If it is to be inverted, "180" is represented. If not, "0" is represented.

As illustrated in FIG. 8, whether the image displayed in the preview mode is to be inverted or not depends on positions 71, 72 and 73 of the origin points determined in second and first display portions 20 and 5, and also depends on the conditions of photographing open/close state 74 representing the open or closed state of cellular phone 1 at the time of photographing of subject 30 as well as the conditions in the previewing mode. These conditions in the previewing mode represent whether cellular phone 1 is to be open or closed, and whether the image for previewing is to be displayed on first display portion 5 or second display portion 20. Thus, these conditions are represented by previewing first display portion (open) 75, previewing second display portion (open) 76 and previewing second display portion (closed) 77.

Figure 10:
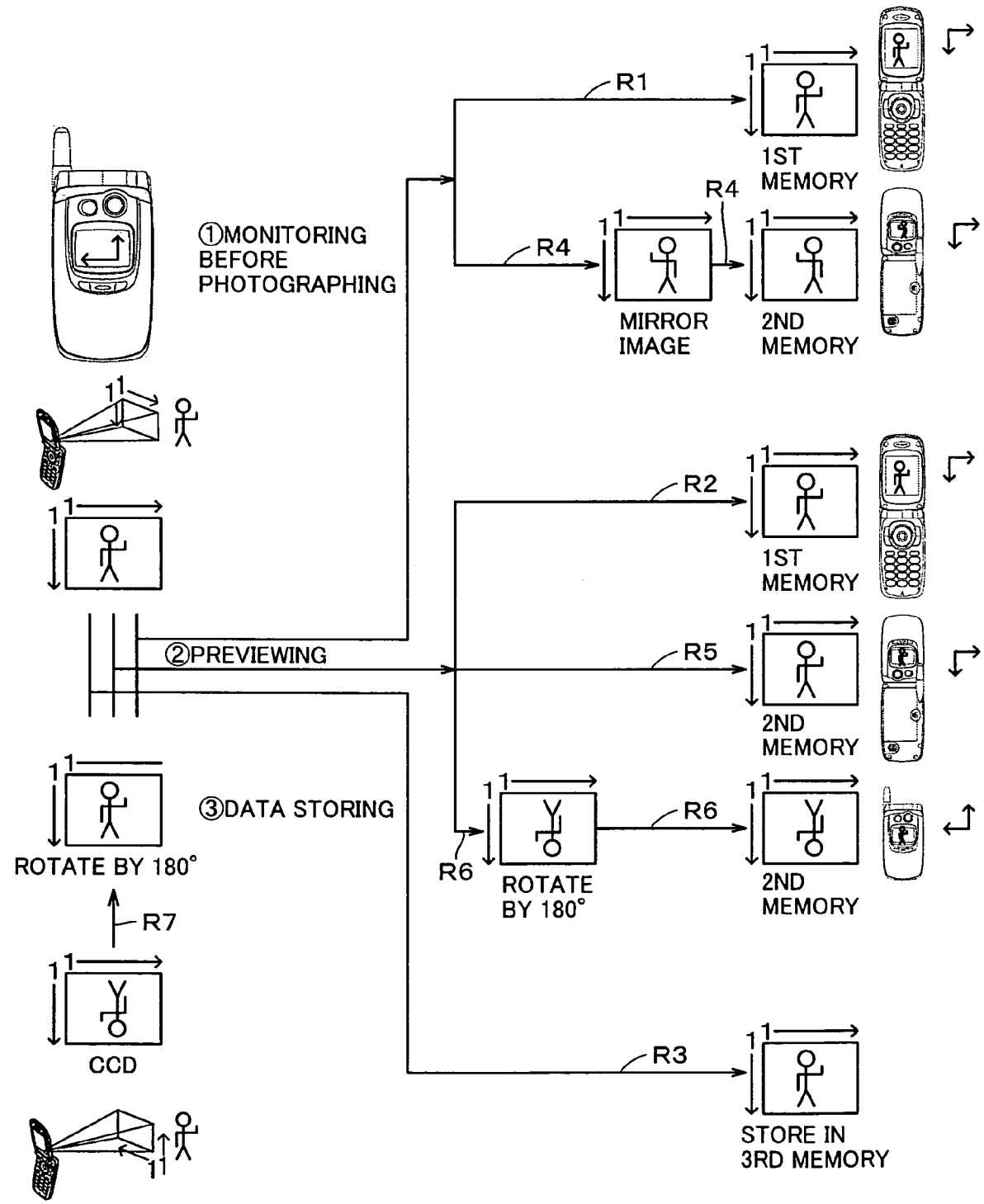
FIG. 10 shows, by way of example, screen displays produced in the steps illustrated in FIG. 1 according to a pattern P2 in FIG. 8.
Figure 11:
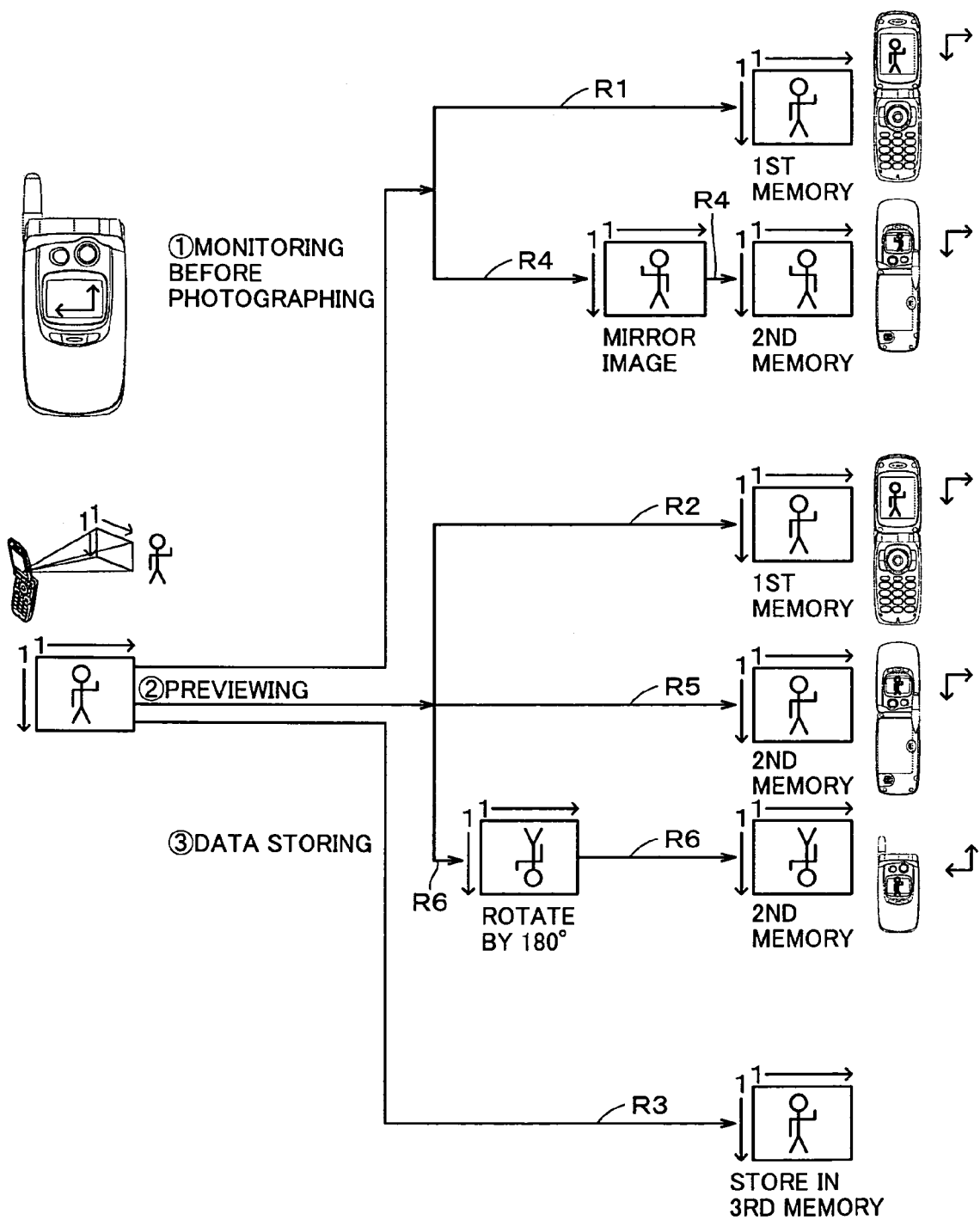
FIG. 11 shows, by way of example, screen displays produced in the steps illustrated in FIG. 1 according to pattern P2 in FIG. 8.
Figure 12:
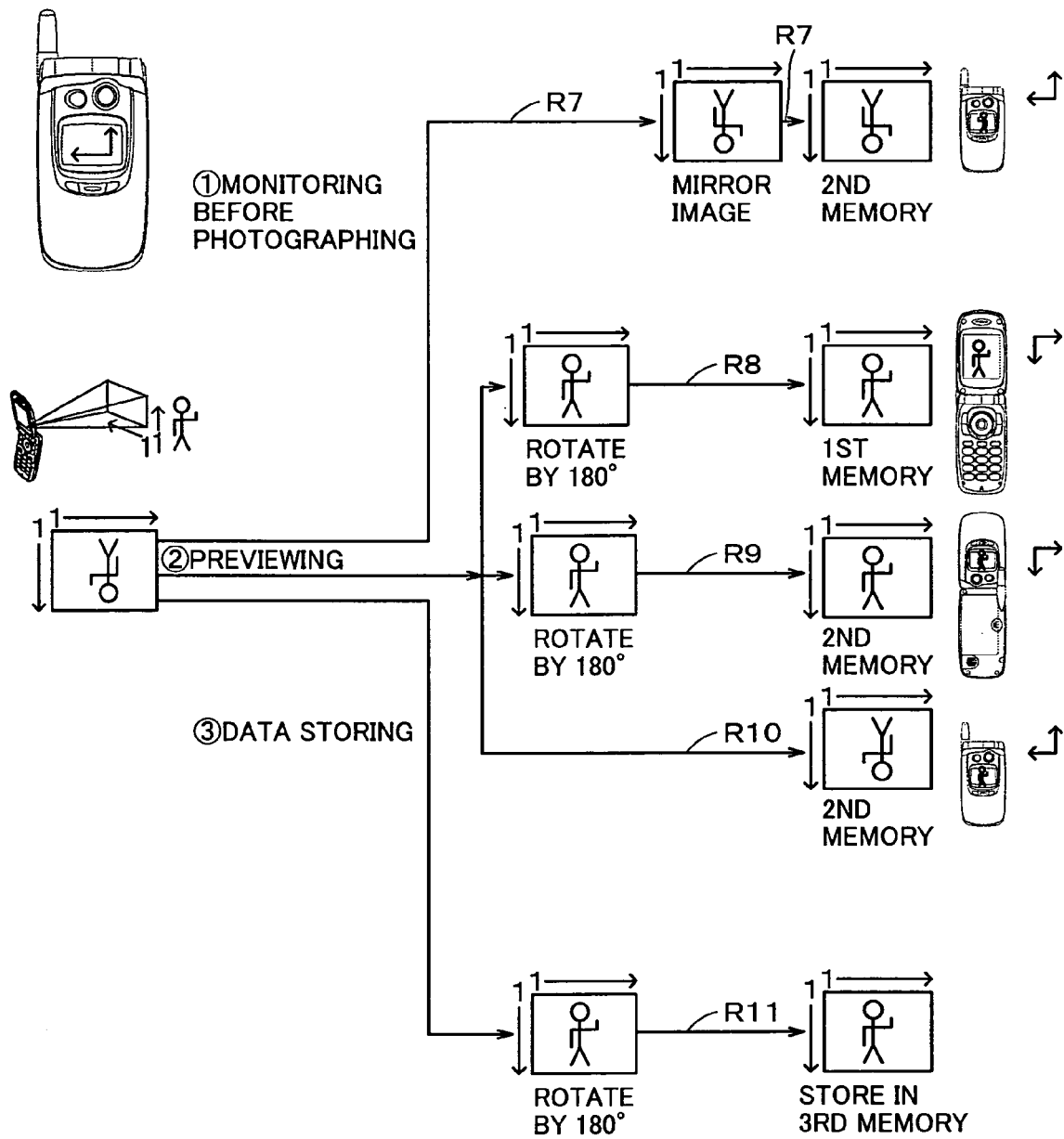
FIG. 12 shows, by way of example, screen displays produced in the steps illustrated in FIG. 1 according to the pattern P2 in FIG. 8.

Description will now be given on steps for taking, previewing and storing images, e.g., in connection with pattern P2 in FIG. 8. FIGS. 10, 11 and 12 show examples of screen displays produced according to the steps in FIG. 1. FIG. 11 illustrates the case where pattern P2 is selected, and photographing open/close state 74 corresponds to the state shown in FIG. 9A. FIG. 12 illustrates the case where pattern P2 is selected, and photographing open/close state 74 corresponds to the state shown in FIG. 9B.

Camera portion 21 of cellular phone 1 takes an image of subject 30, and third memory 52 stores image data thus taken. In this case, the operation mode of cellular phone 1 changes from a monitor mode M1, in which moving images of subject 30 obtained by camera portion 21 are displayed, via a preview mode M2, in which an image is displayed for previewing or checking the image obtained by triggering a shutter, to an image storage mode M3 for storing data of the image previewed in preview mode M2 in third memory 52.

The steps in FIG. 1 starts when a key (not shown) in function button group 8 is operated to enable the photographing function of camera portion 21.

First, control portion 40 enters monitor mode M1, and determines, based on detection signal 53 provided from open/close detecting portion 49, whether cellular phone 1 is open or closed (step S1).

When it is determined that cellular phone 1 is open as shown in FIG. 9A, CCD array 29 receives the reflected light in the normal positions so that the image data processed and provided by CCD 29 of camera portion 21 and image processing portion 41 are stored in first and second memories 42 and 48, as it is (step S2).

Then, control portion 40 determines whether the monitor image is to be displayed on first display portion 5 or second display portion 20 during the photographing operation (step S3). The user has already operated a selector button (not shown) in function button group 8 to select the first or second display portion 5 or 20 for displaying the monitor image during the photographing. Therefore, control portion 40 selects display portion 5 or 20 based on contents of this button operation.

When first display portion 5 is selected, control portion 40 reads the image data from first memory 42, and displays the image according to the image data thus read on first display portion 5 via first display driver portion 43 (step S4). The foregoing operations correspond to the steps according to a route R1 in FIGS. 10 and 11. Then, processing in step S5 starts.

When it is determined in step S1 that cellular phone 1 is closed during the photographing as shown in FIG. 9B, the image data is subjected to the inverting processing, and then is stored in first and second memories 42 and 48 (step S2a). More specifically, control portion 40 provides inversion control signal 55 because the receiving positions of the reflected light on CCD array 29 shown in FIG. 9B are symmetric with respect to the normal positions shown in FIG. 9A, and therefore inverting processing is required for performing the display in the normal positions. In response to reception of inversion control signal 55, inverting processing portion 41A of image processing portion 41 performs the inverting processing on the image data to rotate the corresponding image by 180 degrees in a known manner. This corresponds to the steps in a route R7 shown in FIG. 10.

Then, control portion 40 determines first or second display portion 5 or 20 to be used for displaying the monitor image during the photographing in the manner similar to the above (step S3). When first display portion 5 is to be used, control portion 40 reads the image data from first memory 42, and displays the image according to the image data thus read on first display portion 5 via first display driver portion 43 (step S4). Then, processing is performed in a step S5.

When it is determined in step S3 that the image is to be displayed on second display portion 20, control portion 40 detects the open/close state based on detection signal 53 similarly to the foregoing step S1 (step S3a).

When the open state is detected, the latest image data read from second memory 48 by control portion 40 is processed in a known manner by second display driver portion 44 to provide a mirror image (i.e., to invert laterally) for easy viewing by the user, and second display portion 20 displays the image based on the data thus processed (steps S3b and S3d). Thereby, steps corresponding to a route R4 in FIGS. 10 and 11 are executed. Then, processing is performed in step S5.

When it is determined that cellular phone 1 is closed (step S3a), the following processing is performed. In the closed state, origin point S of CCD 29 is located in the lower right position as shown in FIG. 9B. The user viewing the image assumes that the upper right point is an origin point. Therefore, the latest image data read from second memory 48 is processed by second display driver portion 44 to rotate the image by 180 degrees. Also, processing is performed to provide a mirror image for easy viewing by the user (step S3c). Thereafter, the image data thus processed is processed to display the image in foregoing step S3d. Thereby, processing corresponding to route R7 in FIG. 12 is executed.

Then, control portion 40 determines whether either first or second shutter button 10 or 23 is pressed by the user or not, and whether shutter instruction 56 or 57 is to be provided or not (step S5). When neither of shutter instructions 56 and 57 is provided, it is determined that neither of shutter buttons 10 and 23 is pressed (NO in step S5), and the operation returns to step S3 for repeating the similar processing.

When shutter instruction 56 or 57 is provided, and it is determined that shutter button 10 or 23 is pressed (YES in step S5), the mode changes from monitor mode M1 to preview mode M2.

In the preview mode M2, control portion 40 determines whether the image in the preview mode is to be displayed on first display portion 5 or second display portion 20, in a manner similar to the foregoing manner (step S6).

When it is determined that first display portion 5 is to be used, control portion 40 reads the image data of the latest frame stored in first memory 42, and displays a still image according to the read image data on first display portion 5 via first display driver portion 43 (step S7). Therefore, when first display portion 5 displays the image in the preview mode, the image is present in the normal position on first display portion 5 in either of the open and closed states. The foregoing processing corresponds to the steps according to a route R2 in FIGS. 10 and 11 as well as a route R8 in FIG. 12.

After control portion 40 displays the still image in the preview mode, the mode changes from preview mode M2 to image storage mode M3.

In image storage mode M3, control portion 40 determines whether the image data of the still image displayed for the preview is to be stored in third memory 52 or not (step S8).

More specifically, this determination is performed by determining whether the user, who previewed the image displayed in the preview mode, operated the predetermined button in function button group 8 for storing the image or not. When it is determined that the predetermined button was not operated, and thus the data is not to be stored (NO in step S8), the operation returns to step S1, and similar processing is repeated.

When it is determined that the predetermined button was operated, and the data is to be stored (YES in step S8), third memory 52 stores the image data (step S9). The foregoing processing corresponds to the steps according to a route R3 in FIGS. 10 and 11 as well as a route R11 in FIG. 12. Thereafter, the operation returns to step S1, and similar processing is repeated.

When it is determined that second display portion 20 is to be used for displaying the image in preview mode M2 (step S6), inversion of the image data may be required according to the open or closed state of cellular phone 1 (step S6a) so that processing is performed as follows.

In the closed state, the image data (i.e., the image data stored in the normal position) in second memory 48 is read and displayed on second display portion 20 via second display driver portion 44 without inversion (step S6b). This corresponds to the steps according to a route R5 in FIGS. 10 and 11 as well as a route R9 in FIG. 12.

In the closed state, the origin point in second display portion 20 is located in the lower right position, which is diagonally opposite to that in the open state. Therefore, if second display portion 20 displays the image according to the image data in second memory 48 as it is, the image is displayed in the inverted position. Accordingly, control portion 40 controls second display driver portion 44 to display the image on second display portion 20 after rotates the image data read from second memory 48 by 180 degrees (step S6c). In this case, control portion 40 does not perform processing of producing a mirror image for previewing the image to be stored as the image data in third memory 52. The above processing corresponding to the steps according to a route R6 in FIGS. 10 and 11 as well as a route R10 in FIG. 12.

Figure 13:
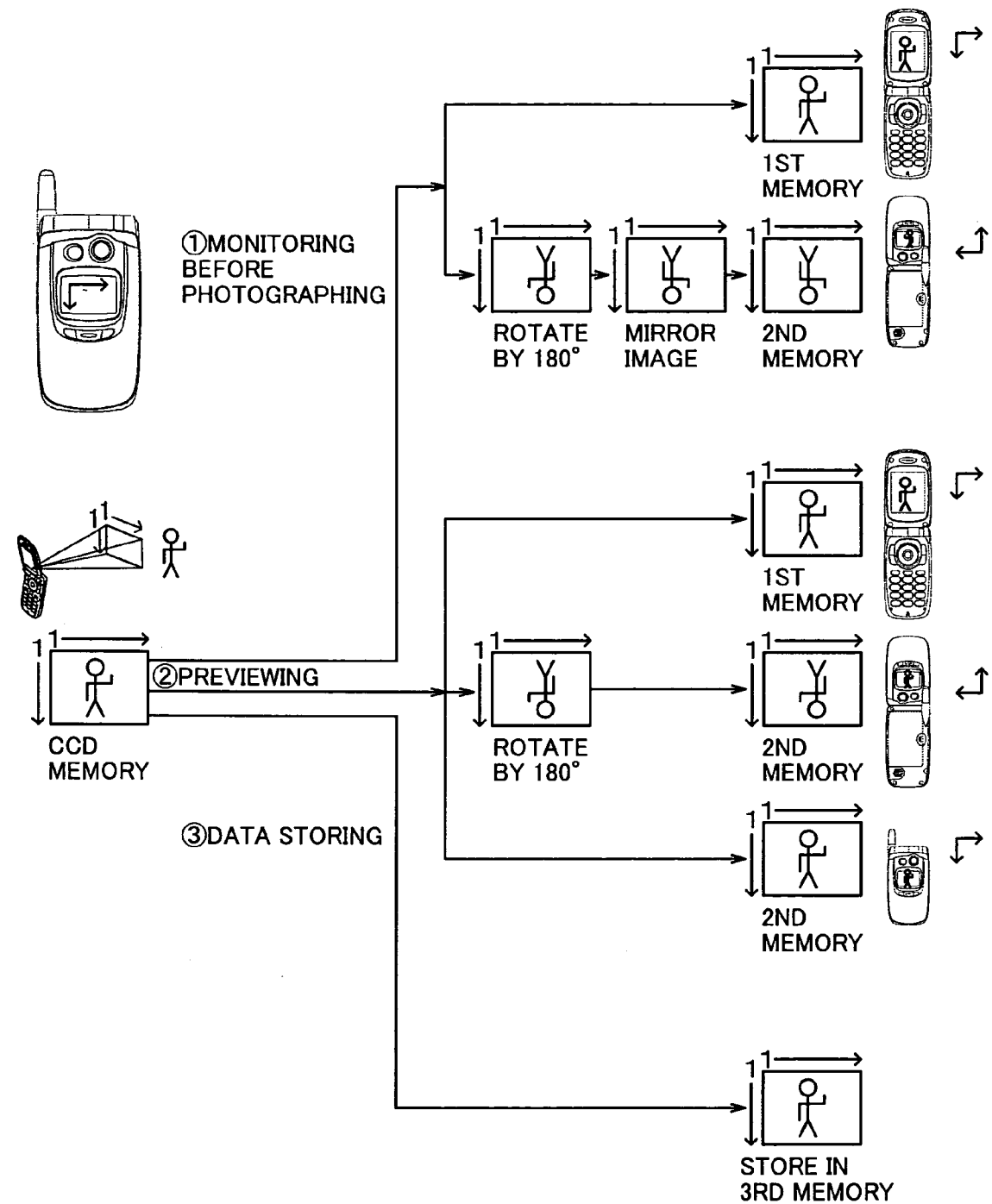
FIG. 13 shows, by way of example, screen displays produced in the steps illustrated in FIG. 1 according to a pattern P1 in FIG. 8.
Figure 14:
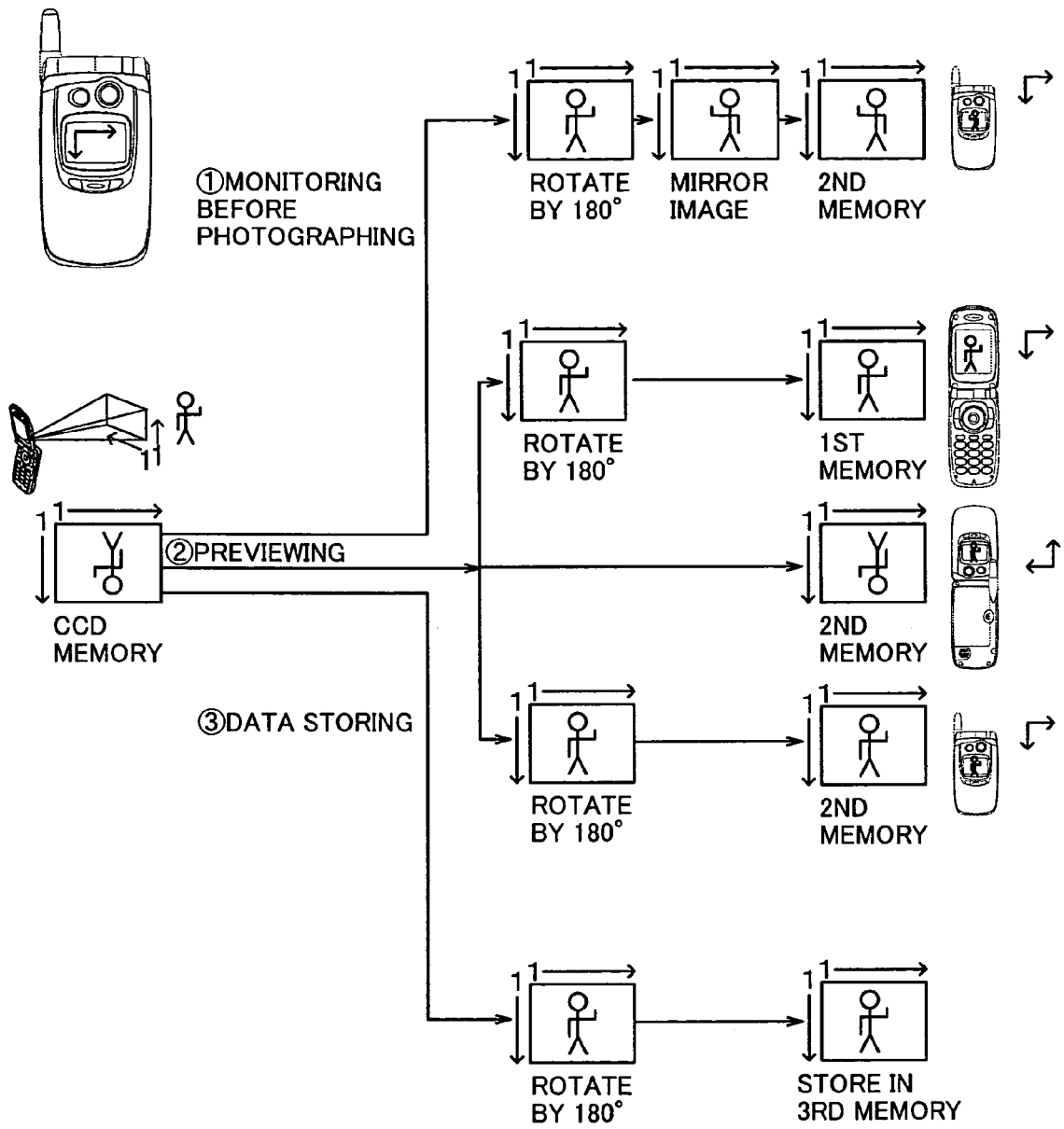
FIG. 14 shows, by way of example, screen displays in the processing illustrated in FIG. 1 according to pattern P1 in FIG. 8.
Figure 15A:
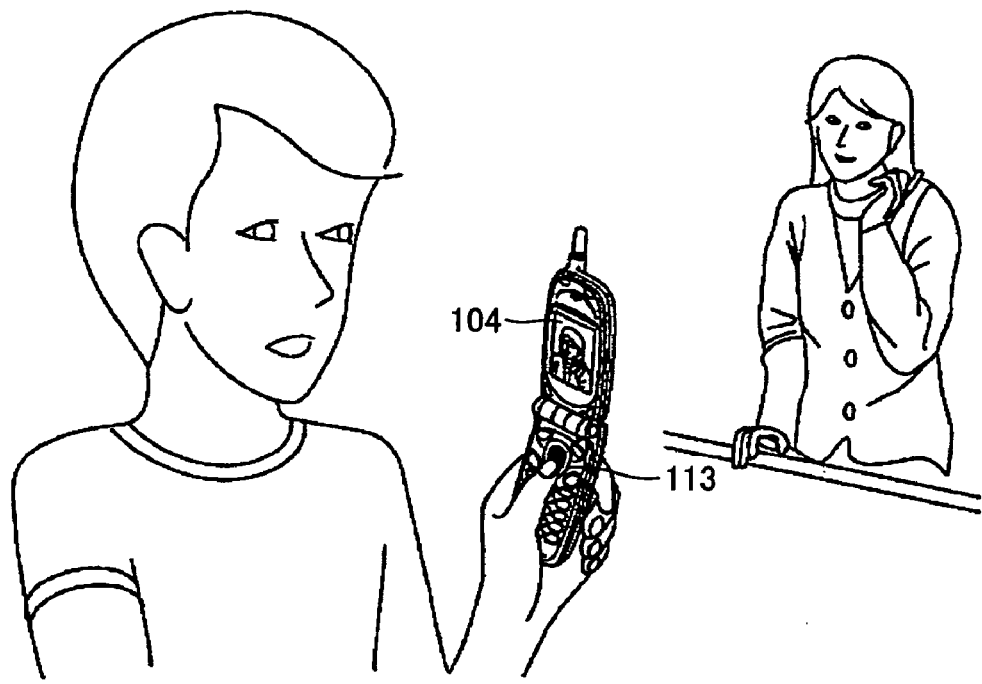
FIGS. 15A and 15B are schematic views of a cellular phone for illustrating a prior art.
Figure 15B:
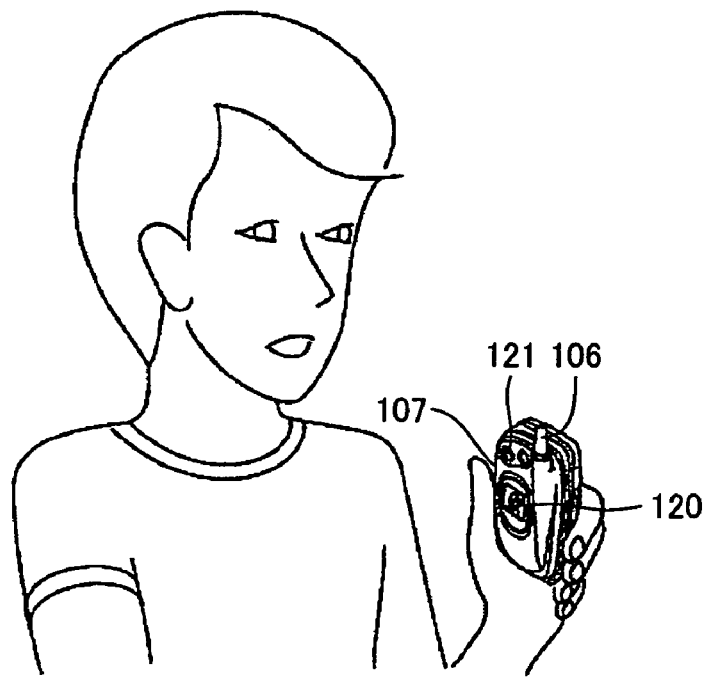

FIGS. 13 and 14 show examples of screen displays similarly to FIGS. 11 and 12, and particularly show screen displayed, which correspond to pattern P1 in FIG. 8, and are produced in accordance with the steps in FIG. 1.

According to the steps illustrated in FIG. 1, the image displayed on second display portion 20 in the preview mode is selectively inverted by 180 degrees depending on the open/close state so that second display portion 20 may display the image in the normal position. Therefore, the user can preview the image in the normal position on second display portion 20 without changing the position of cellular phone 1 in the user's hand.

In this embodiment, first memory 42 for first display portion 5 is independent of second memory 48 for second display portion 20. This is because the first and second display portions 5 and 20 are different in size of the screen and thus in size of displayed image from each other. However, instead of this structure employing the different memories for the first and second display portions, respectively, first and second display portions 5 and 20 may share a memory. In this case, image data in the shared memory may be enlarged to provide data for first display portion 5, and may be reduced to provide data for second display portion 20. More specifically, first and second display driver portions 43 and 44 may be provided with processing portions for the enlarging processing and the reducing processing described above, respectively.

In this embodiment, it is determined in steps S3 and S6 whether the image is to be displayed on first display portion 5 or second display portion 20, and this determination is performed according to the operation of the selector button. However, this determination may be performed based on detection signal 53. More specifically, when it is determined from detection signal 53 that cellular phone 1 is open, first display portion 5 is selected as the display portion for the image. When it is determined that cellular phone 1 is closed, second display portion 20 is selected as the display portion for the image.

In the structure, which displays the image on only one of the first and second display portions, power consumption of cellular phone 1 can be reduced. Alternatively, such a structure may be employed that both the first and second display portions always display the images. Thereby, one of users can preview the image on first display portion 5, and the other user can simultaneously preview the image on second display portion 20. In this manner, two users can simultaneously view the images in the normal position on different screens, respectively. This further improves convenience.

(Another Embodiment)

Cellular phone 1 according to the foregoing embodiment is provided at first body 2 with the two display portions (first and second display portions 5 and 20). However, first display portion 5 may be eliminated, and only second display portion 20 may be employed. In this case, second display driver portion 44 inverts the direction of the image displayed on second display portion 20 in the preview mode when the state changes between the folded state (closed state) and the open state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable device comprising:
   a first body, a second body and a coupling portion coupling said first and second bodies together, said coupling portion coupling said first and second bodies in a foldable fashion, wherein said portable device further includes
   photographing means capable of photographing in both a folded state and an open state of said portable device, said photographing means being provided on an outside surface of said second body wherein said photographing means is substantially inverted when the portable device is manipulated from the folded state to the open state,
   preview image display means for displaying a preview image based on an image taken and provided by said photographing means for previewing the provided image before storing,
   a first display portion provided on a surface hidden in the folded state, and
   a second display portion provided on a surface exposed externally in the folded state and the open state, said second display portion displaying the image in one of opposite directions corresponding to the folded state and the open state, respectively; and said preview image display means includes first preview display means for displaying said preview image on said first display portion, and second preview display means for displaying the preview image rotated by 180 degrees on said second display portion in either the folded state or the open state for previewing.

2. The portable device according to claim 1 further comprising:
a storing portion temporarily storing the image provided from said photographing means for reading by said preview image display means for providing said preview image,
wherein said storing portion is shared by said first and second preview display means.

3. The portable device according to claim 1 further comprising:
a storing portion temporarily storing the image provided from said photographing means for reading by said preview display means for providing said preview image,
wherein said storing portion is shared by said first and second preview display means.

4. The portable device according to claim 1, further comprising:
a storing portion temporarily storing the image provided from said photographing means for reading by said preview display means for providing said preview image,
wherein said storing portion is shared by said first and second preview display means.

5. A portable device comprising:
a first body, a second body and a coupling portion coupling said first and second bodies together, said coupling portion coupling said first and second bodies in a foldable fashion, wherein said portable device further includes:
photographing means for taking and providing an image in one of opposite directions corresponding to a folded state and an open state of said portable device, respectively, said photographing means being provided on an outside surface of said second body wherein said photographing means is substantially inverted when the portable device is manipulated from the folded state to the open state
preview image display means for displaying a preview image based on the image taken and provided by said photographing means for previewing the provided image before storing,
a first display portion provided on a surface hidden in the folded state, and
a second display portion provided on a surface exposed eternally in the folded state and the open state, said second display portion displaying the image in one of opposite directions corresponding to the folded state and the open state, respectively;
said preview image display means includes
first preview display means for displaying said preview image on said first display portion, and
second preview display means for displaying said preview image on said second display portion; and
said second preview display means operating for the previewing in the open state rotates the image provided from said photographing means during the photographing operation in either the folded state or the open state by 180 degrees.

6. The portable device according to claim 5, further comprising:
a storing portion temporarily storing the image provided from said photographing means for reading by said preview display means for providing said preview image,
wherein said storing portion is shared by said first and second preview display means.

7. The portable device according to claim 5, further comprising:
a storing portion temporarily storing the image provided from said photographing means for reading by said preview display means for providing said preview image,
wherein said storing portion is shared by said first and second preview display means.

8. The portable device according to claim 5, further comprising:
a storing portion temporarily storing the image provided from said photographing means for reading by said preview display means for providing said preview image,
wherein said storing portion is shared by said first and second preview display means.

9. A portable device comprising:
a first body, a second body and a coupling portion coupling said first and second bodies together, said coupling portion coupling said first and second bodies in a foldable fashion, wherein said portable device further includes:
photographing means for taking and providing an image in one of opposite directions corresponding to a folded state and an open state of said portable device, respectively, said photographing means being provided on an outside surface of said second body wherein said photographing means is substantially inverted when the portable device is manipulated from the folded state to the open state,
preview image display means for displaying a preview image based on the image taken and provided by said photographing means for previewing the provided image before storing,
a first display portion provided on a surface hidden in the folded state, and
a second display portion provided on a surface exposed eternally in the folded state and the open state, said second display portion displaying the image in one of opposite directions corresponding to the folded state and the open state, respectively;
said preview image display means includes
first preview display means for displaying said preview image on said first display portion, and
second preview display means for displaying said preview image on said second display portion; and
said second preview display means operating for the previewing in the folded state rotates the image provided from said photographing means during the photographing operation in either the folded state or the open state by 180 degrees.

10. The portable device according to claim 9, further comprising:
a storing portion temporarily storing the image provided from said photographing means for reading by said preview display means for providing said preview image,
wherein said storing portion is shared by said first and second preview display means.

11. The portable device according to claim 9, further comprising:
 a storing portion temporarily storing the image provided from said photographing means for reading by said preview display means for providing said preview image, wherein
 said storing portion is shared by said first and second preview display means.

12. The portable device according to claim 9, further comprising:
 a storing portion temporarily storing the image provided from said photographing means for reading by said preview display means for providing said preview image,
 wherein said storing portion is shared by said first and second preview display means.

13. A portable device comprising:
 a first body, a second body and a coupling portion coupling said first and second bodies together, said coupling portion coupling said first and second bodies in an openable fashion, wherein said portable device further includes:
 a camera portion capable of photographing in either of a closed state and an open state of said portable device, said camera portion being provided on an outside surface of said second body wherein said camera portion is substantially inverted when the portable device is manipulated from the folded state to the open state,
 preview image display means for displaying a preview image based on the image taken and provided by said camera portion for previewing the provided image before storing, and
 a display portion displaying the image in one of opposite directions corresponding to the closed state and the open state, respectively; and
 said preview image display means displays said preview image on said display portion, and said preview image is rotated by 180 degrees in either the closed state or the open state.

\* \* \* \* \*